(12) United States Patent
Chriki et al.

(10) Patent No.: US 11,860,369 B2
(45) Date of Patent: Jan. 2, 2024

(54) OPTICAL SYSTEM WITH COMPACT COUPLING FROM A PROJECTOR INTO A WAVEGUIDE

(71) Applicant: Lumus Ltd., Ness Ziona (IL)

(72) Inventors: Ronen Chriki, Lod (IL); Tsion Eisenfeld, Ashkelon (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/039,260

(22) PCT Filed: Mar. 1, 2022

(86) PCT No.: PCT/IL2022/050226
§ 371 (c)(1),
(2) Date: May 29, 2023

(87) PCT Pub. No.: WO2022/185306
PCT Pub. Date: Sep. 9, 2022

(65) Prior Publication Data
US 2023/0350204 A1 Nov. 2, 2023

Related U.S. Application Data

(60) Provisional application No. 63/154,870, filed on Mar. 1, 2021.

(51) Int. Cl.
*G02B 27/01* (2006.01)
*G02B 27/28* (2006.01)

(52) U.S. Cl.
CPC ........ *G02B 27/0172* (2013.01); *G02B 27/283* (2013.01)

(58) Field of Classification Search
None
See application file for complete search history.

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

CN 104503087 4/2015
DE 102019205138 10/2019
(Continued)

OTHER PUBLICATIONS

International Commission on Non-Ionizing Radiation Protection "ICNIRP Guidelines for Limiting Exposure To Time-Varying Electric, Magnetic and Electromagnetic Fields (Up to 300 Ghz)" Published In: Health Physics 74 (4):494-522; 1998.
(Continued)

*Primary Examiner* — Andrew Jordan
(74) *Attorney, Agent, or Firm* — Mark M. Friedman

(57) ABSTRACT

An optical system includes a light-guide optical element (LOE) (10) having mutually-parallel first and second major external surfaces (11, 12) for guiding light by internal reflection, and a projector (100) that projects illumination corresponding to a collimated image from an aperture (101). The projector injects light in to the LOE via a coupling prism (30) attached to the first major external surface (11) that projects an image injection surface. A reflective polarizing beam splitter (51) is deployed at an interface between the major external surface (11) and the coupling prism (30) parallel to the major external surfaces, to selectively transmit illumination from the coupling prism into the LOE while trapping light already within the LOE so as to propagate within the LOE by internal reflection.

8 Claims, 8 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,870,159 A | 2/1999 | Sharp |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,285,420 B1 | 9/2001 | Mizumo et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,421,031 B1 | 7/2002 | Ronzani et al. |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,580,529 B1 | 4/2003 | Amitai et al. |
| 6,577,411 B1 | 6/2003 | David |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Ida et al. |
| 6,829,095 B2 | 12/2004 | Amitai |
| 6,927,694 B1 | 8/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,589,901 B2 | 9/2009 | DeJong et al. |
| 7,643,214 B2 | 1/2010 | Amitai |
| 7,672,055 B2 | 3/2010 | Amitai |
| 7,724,443 B2 | 5/2010 | Amitai |
| 7,778,508 B2 | 8/2010 | Hirayama |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,107,351 B2 * | 1/2012 | Oto .................... G03B 21/2073 369/112.14 |
| 8,369,019 B2 | 2/2013 | Baker |
| 8,405,573 B2 | 3/2013 | Lapidot et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,718,437 B2 | 5/2014 | Sullivan et al. |
| 8,736,963 B2 | 5/2014 | Robbins et al. |
| 8,743,464 B1 | 6/2014 | Amirparviz |
| 8,760,762 B1 | 6/2014 | Kelly |
| 8,913,865 B1 | 12/2014 | Bennett |
| 8,917,453 B2 | 12/2014 | Bohn |
| 8,965,152 B2 | 2/2015 | Simmonds |
| 9,170,425 B1 | 10/2015 | Harrison et al. |
| 9,285,591 B1 | 3/2016 | Gupta et al. |
| 9,348,143 B2 | 5/2016 | Gao et al. |
| 9,513,479 B2 | 12/2016 | Komatsu et al. |
| 9,551,880 B2 | 1/2017 | Amitai |
| 9,740,006 B2 | 8/2017 | Gao |
| 9,805,633 B2 | 10/2017 | Zheng |
| 9,927,614 B2 | 3/2018 | Vallius |
| 9,933,684 B2 | 4/2018 | Brown et al. |
| 10,007,115 B2 | 6/2018 | Greenhalgh |
| 10,198,865 B2 | 2/2019 | Kezele et al. |
| 10,209,517 B2 | 2/2019 | Popovich et al. |
| 10,326,983 B2 | 6/2019 | Hua |
| 10,345,903 B2 | 7/2019 | Robbins et al. |
| 10,409,064 B2 | 9/2019 | Lee |
| 10,416,452 B2 | 9/2019 | Cheng et al. |
| 10,551,622 B2 | 2/2020 | Robbins et al. |
| 11,226,261 B2 | 1/2022 | Lobachinsky et al. |
| 11,728,901 B2 * | 8/2023 | Kowalevicz .......... G01S 17/003 398/180 |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai |
| 2005/0248852 A1 | 11/2005 | Yamasaki |
| 2005/0265044 A1 | 12/2005 | Chen et al. |

(56) References Cited

U.S. PATENT DOCUMENTS

| | | |
|---|---|---|
| 2006/0052146 A1 | 3/2006 | Ou |
| 2006/0061555 A1 | 3/2006 | Mullen |
| 2006/0103590 A1 | 5/2006 | Divon |
| 2006/0126182 A1 | 6/2006 | Levola |
| 2006/0268421 A1 | 11/2006 | Shimizu et al. |
| 2006/0291021 A1 | 12/2006 | Kawa |
| 2007/0007157 A1 | 1/2007 | Buschmann et al. |
| 2007/0064310 A1 | 3/2007 | Mukawa et al. |
| 2007/0070859 A1 | 3/2007 | Hirayama |
| 2007/0091445 A1 | 4/2007 | Amitai |
| 2007/0165192 A1 | 7/2007 | Prior |
| 2007/0188837 A1 | 8/2007 | Shimizu et al. |
| 2008/0094586 A1 | 4/2008 | Hirayama |
| 2008/0106775 A1 | 5/2008 | Amitai et al. |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0239422 A1 | 10/2008 | Noda |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0020204 A1 | 1/2010 | Fleischer et al. |
| 2010/0067110 A1 | 3/2010 | Hadad et al. |
| 2010/0111472 A1 | 5/2010 | DeJong |
| 2010/0171680 A1 | 7/2010 | Lapidot et al. |
| 2010/0201953 A1 | 8/2010 | Freeman et al. |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0194163 A1 | 8/2011 | Shimizu et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0306940 A1 | 2/2012 | Machida |
| 2012/0062998 A1 | 3/2012 | Schultz et al. |
| 2012/0120498 A1 | 5/2012 | Harrison |
| 2012/0127062 A1 | 5/2012 | Zeev et al. |
| 2012/0147361 A1 | 6/2012 | Mochizuki et al. |
| 2012/0179369 A1 | 6/2012 | Lapidot et al. |
| 2012/0194781 A1 | 8/2012 | Agurok |
| 2013/0002122 A1 | 1/2013 | Bell |
| 2013/0022316 A1 | 1/2013 | Pelletier et al. |
| 2013/0012022 A1 | 5/2013 | Cajigas et al. |
| 2013/0165017 A1 | 6/2013 | Liu |
| 2013/0229717 A1 | 9/2013 | Amitai |
| 2013/0257832 A1 | 10/2013 | Hammond |
| 2013/0276960 A1 | 10/2013 | Amitai |
| 2013/0279017 A1 | 10/2013 | Amitai |
| 2013/0321432 A1 | 12/2013 | Burns |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0160577 A1 | 6/2014 | Dominici et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160460 A1 | 6/2015 | Komatsu et al. |
| 2015/0160529 A1 | 6/2015 | Popovich et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0241619 A1 | 8/2015 | Richards et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2015/0293434 A1 | 10/2015 | Matsuo |
| 2016/0018654 A1 | 1/2016 | Haddick et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0198949 A1 | 7/2016 | Spitzer |
| 2016/0209648 A1 | 7/2016 | Haddick et al. |
| 2016/0209657 A1 | 7/2016 | Popovich et al. |
| 2016/0234485 A1 | 8/2016 | Robbins et al. |
| 2016/0238844 A1 | 8/2016 | Dobschal |
| 2016/0266387 A1 | 9/2016 | Tekolste et al. |
| 2016/0282622 A1 | 9/2016 | Hiraide |
| 2016/0314564 A1 | 10/2016 | Jones |
| 2016/0341964 A1 | 11/2016 | Amitai |
| 2016/0349518 A1 | 12/2016 | Amitai et al. |
| 2016/0370693 A1 | 12/2016 | Watanabe |
| 2017/0003504 A1 | 1/2017 | Vallius |
| 2017/0017095 A1 | 1/2017 | Fricker et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0242249 A1 | 4/2017 | Wall |
| 2017/0122725 A1 | 5/2017 | Yeoh |
| 2017/0248790 A1 | 8/2017 | Cheng |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0045960 A1 | 2/2018 | Palacios et al. |
| 2018/0067315 A1 | 3/2018 | Amitai et al. |
| 2018/0157057 A1 | 6/2018 | Gelberg et al. |
| 2018/0188631 A1 | 7/2018 | Lu et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0335629 A1 | 11/2018 | Checng et al. |
| 2018/0373039 A1 | 12/2018 | Amitai |
| 2019/0011710 A1 | 1/2019 | Amitai |
| 2019/0018247 A1 | 1/2019 | Gao et al. |
| 2019/0025053 A1* | 1/2019 | Slotwinski .............. G01S 17/89 |
| 2019/0026864 A1 | 1/2019 | Chen et al. |
| 2019/0056600 A1 | 2/2019 | Danziger et al. |
| 2019/0064518 A1 | 2/2019 | Danziger |
| 2019/0064519 A1 | 2/2019 | Ben-Asher et al. |
| 2019/0086674 A1 | 3/2019 | Sinay et al. |
| 2019/0008667 A1 | 5/2019 | Sinay et al. |
| 2019/0155035 A1 | 5/2019 | Amitai |
| 2019/0162976 A1 | 5/2019 | Sondermann et al. |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0322382 A1 | 10/2019 | Mackin |

(56) References Cited

U.S. PATENT DOCUMENTS

| | | |
|---|---|---|
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0150332 A1 | 5/2020 | Nakamura et al. |
| 2020/0159030 A1 | 5/2020 | Ayres |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033774 A1 | 2/2021 | Tanaka |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2022/0004007 A1 | 1/2022 | Bhakta |
| 2022/0004014 A1 | 1/2022 | Ronen et al. |
| 2022/0035021 A1 | 2/2022 | Billaud et al. |
| 2022/0082838 A1 | 3/2022 | Grabarnik et al. |
| 2022/0107499 A1 | 4/2022 | Amitai |
| 2022/0329326 A1* | 10/2022 | Kowalevicz ............ G01S 17/46 |

FOREIGN PATENT DOCUMENTS

| | | |
|---|---|---|
| JP | S61140925 A | 12/1984 |
| JP | 2003140081 | 5/2003 |
| JP | 2017108370 | 6/2017 |
| JP | 2012123936 | 6/2021 |
| WO | WO 2013/145147 | 8/2015 |
| WO | 2021009766 | 1/2021 |
| WO | 2021152602 | 8/2021 |
| WO | 2022/070197 | 4/2022 |
| WO | WO/2022/120262 | 6/2022 |

OTHER PUBLICATIONS

Charles B. Owen et all; "Display-Relative Calibration for Optical See-Through Head-Mounted Displays"; Proceedings of the Third IEEE and ACM International Symposium on Mixed and Augmented Reality, Nov. 2-5, Arlington,VA, USA, IEEE, Piscataway, NJ, USA, Nov. 2, 2004 (Nov. 2, 2004), pp. 70-78,XP058382672.

Da-Yong et al., "A Continuous Membrane Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

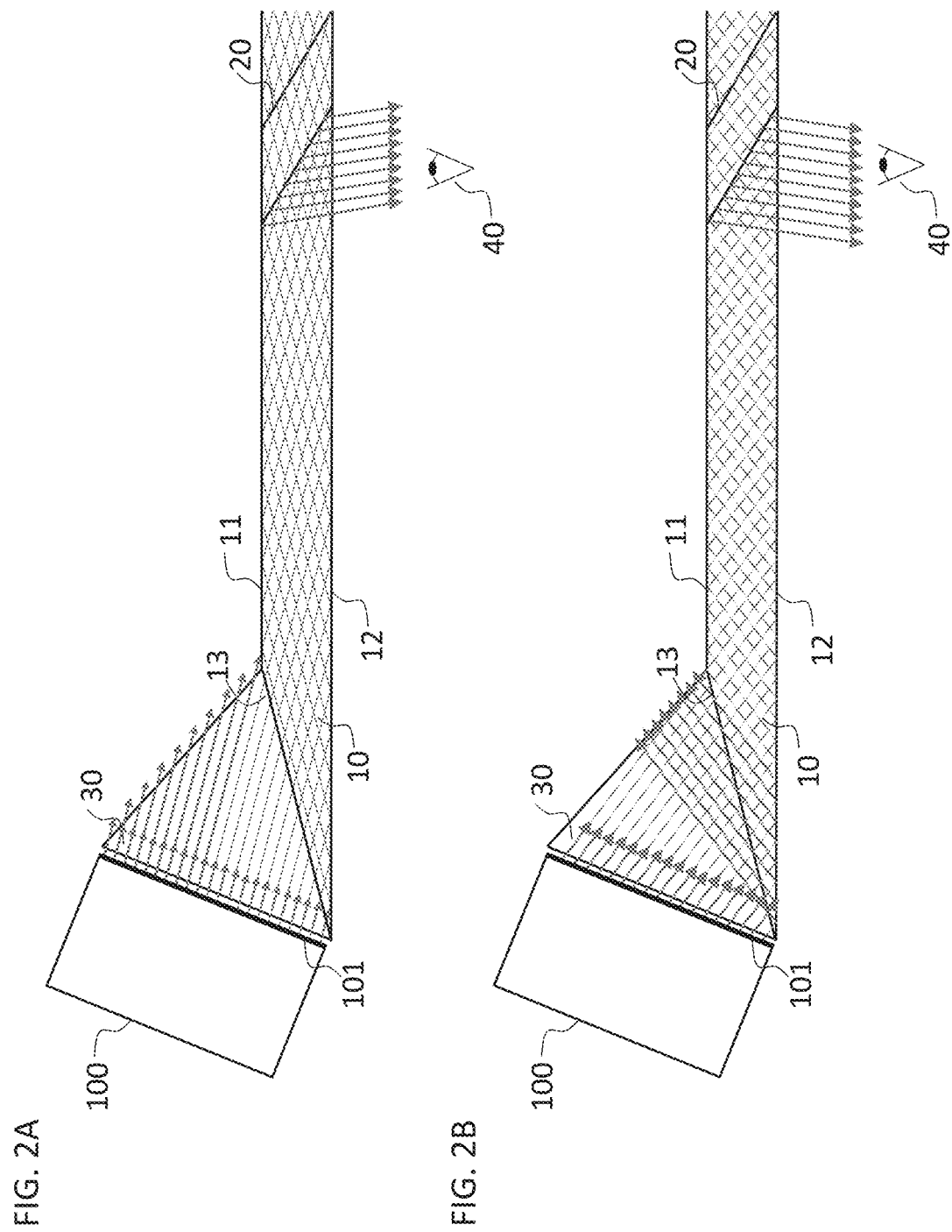

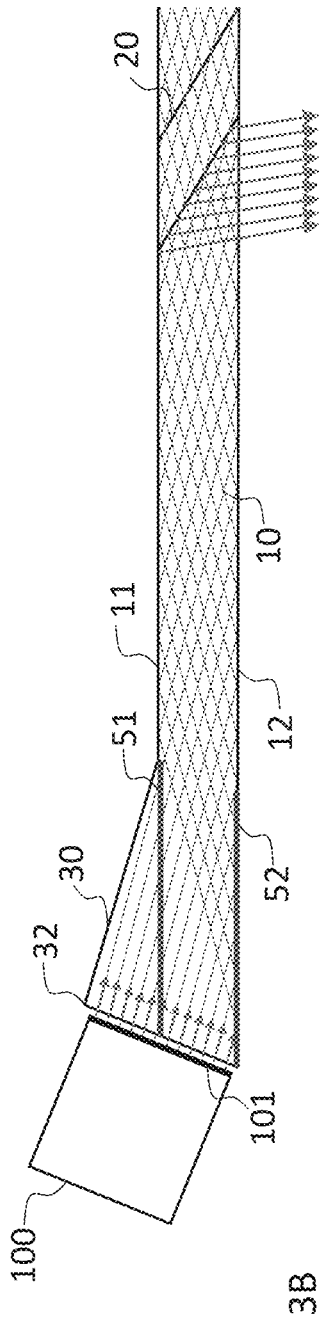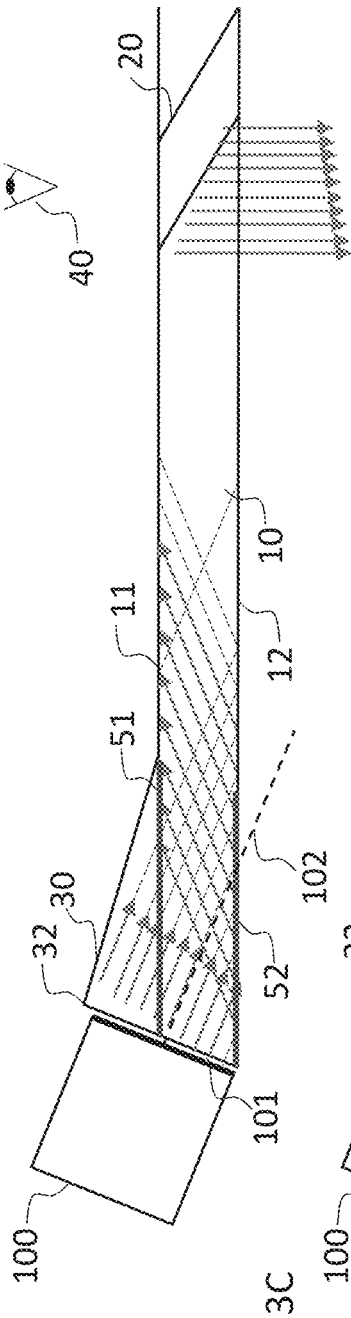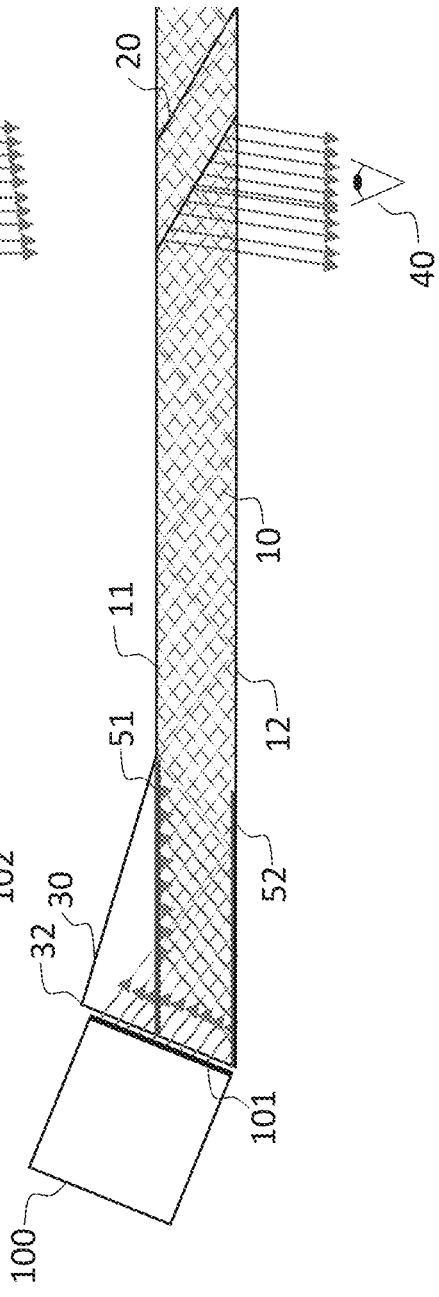

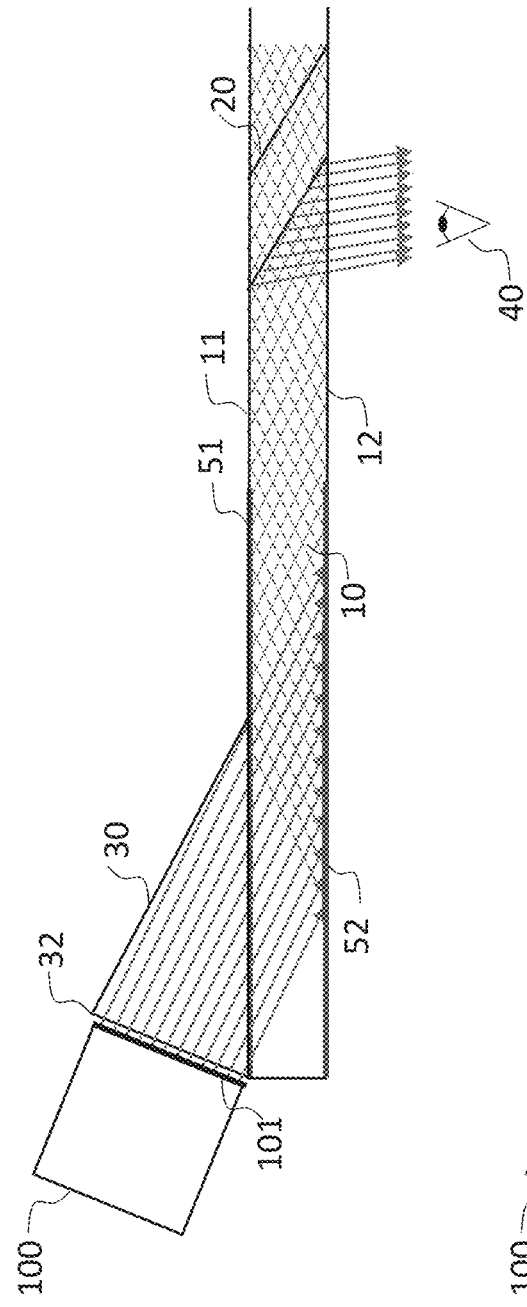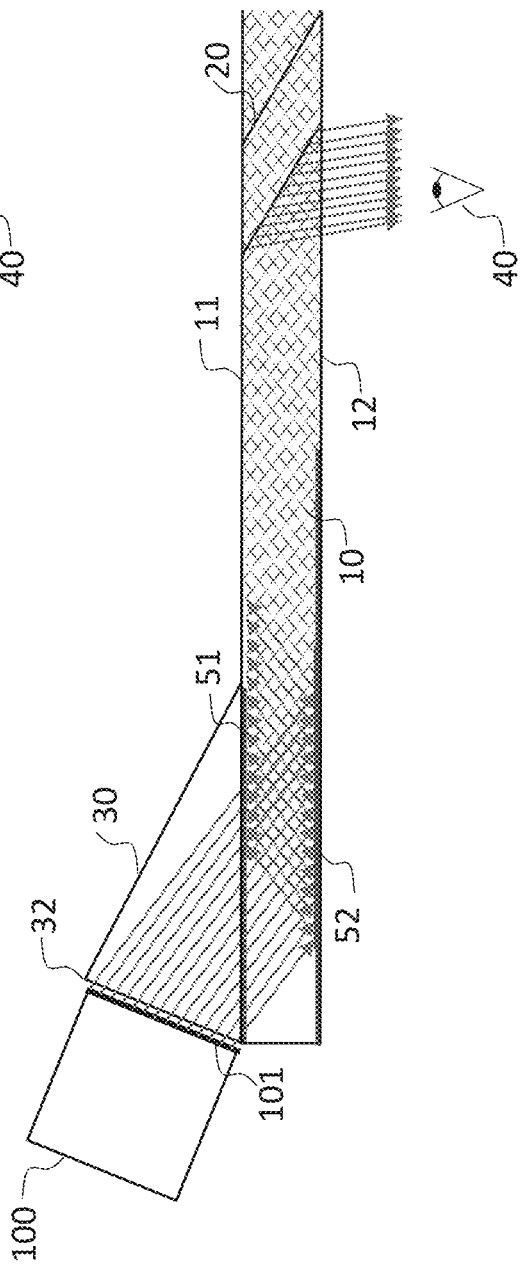

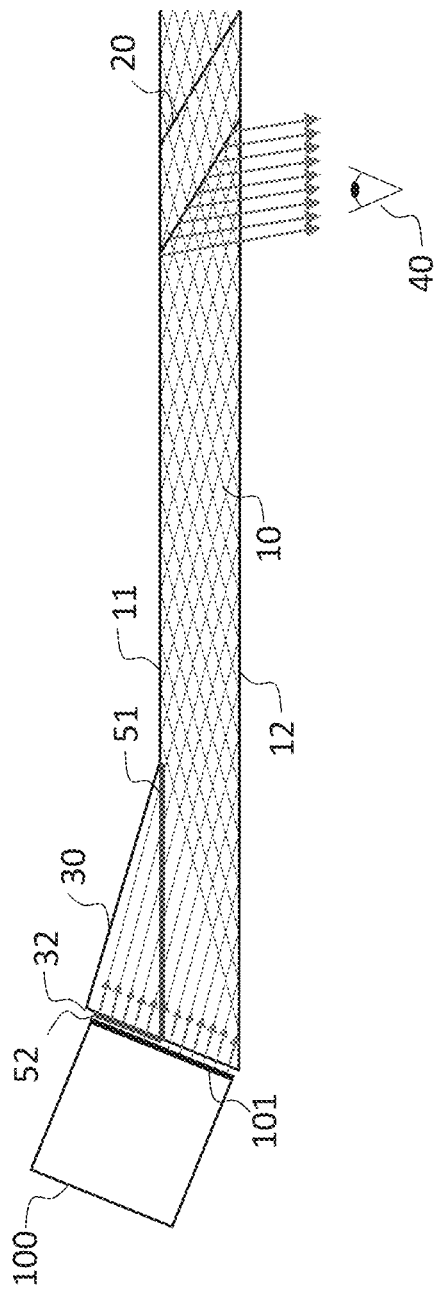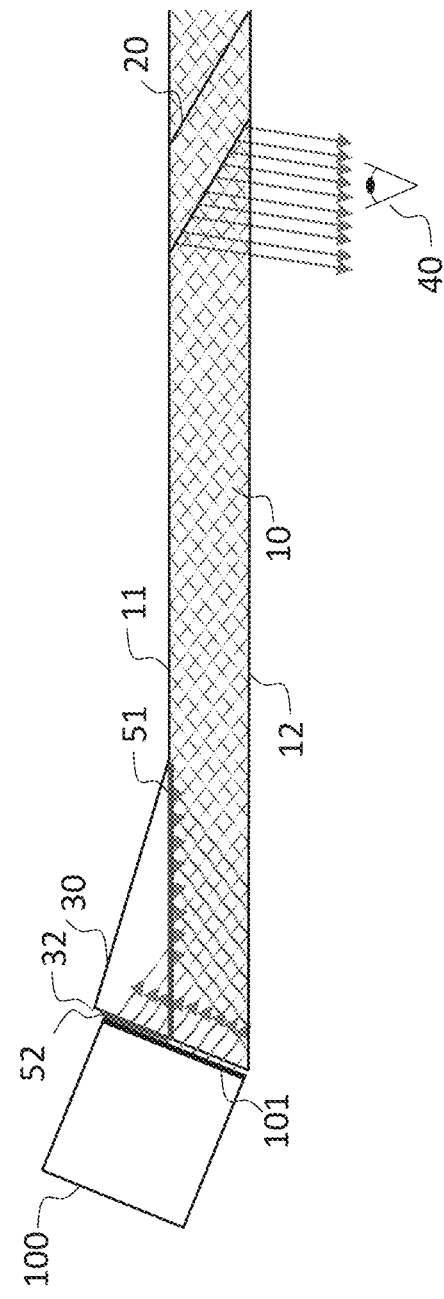

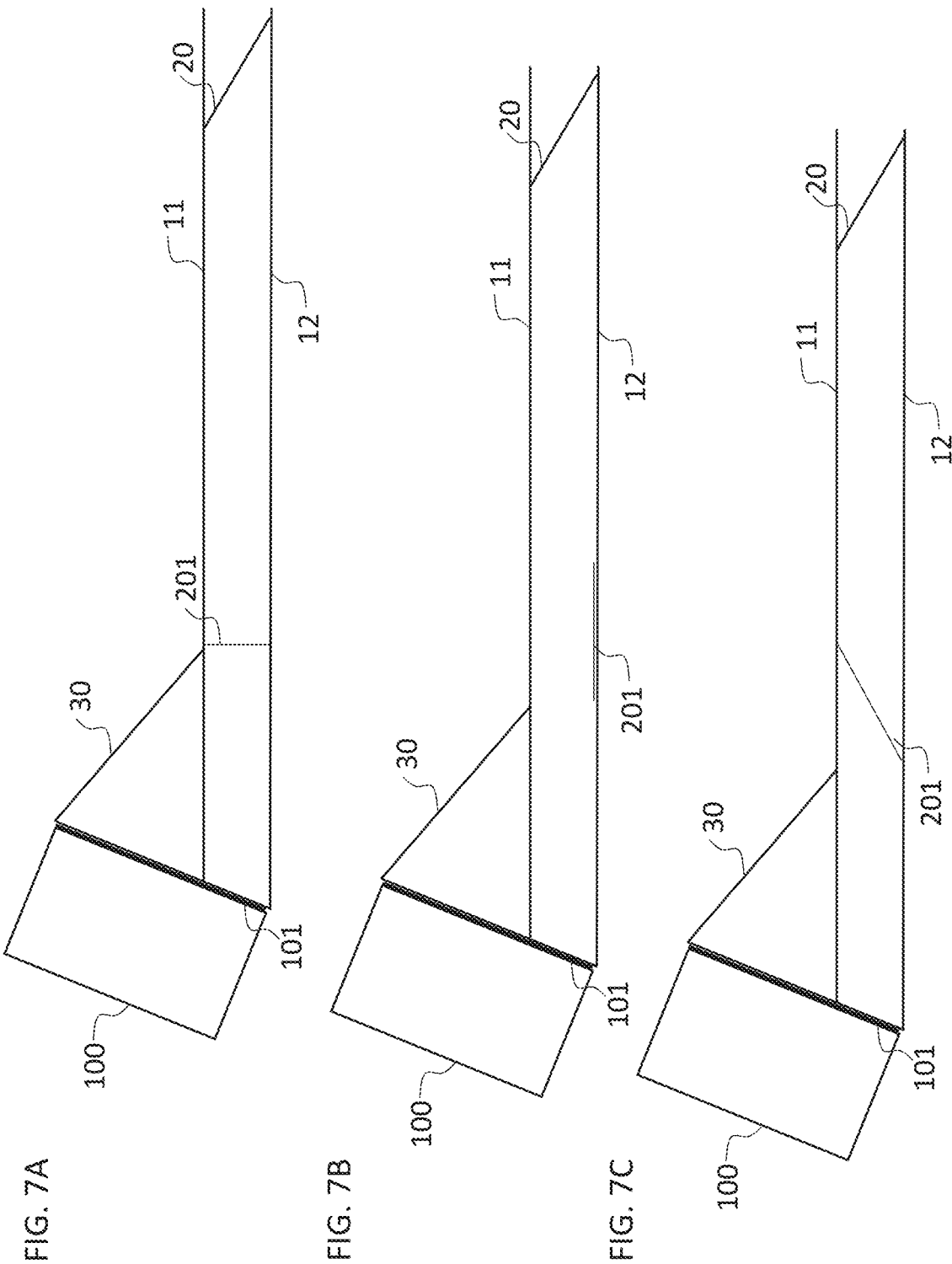

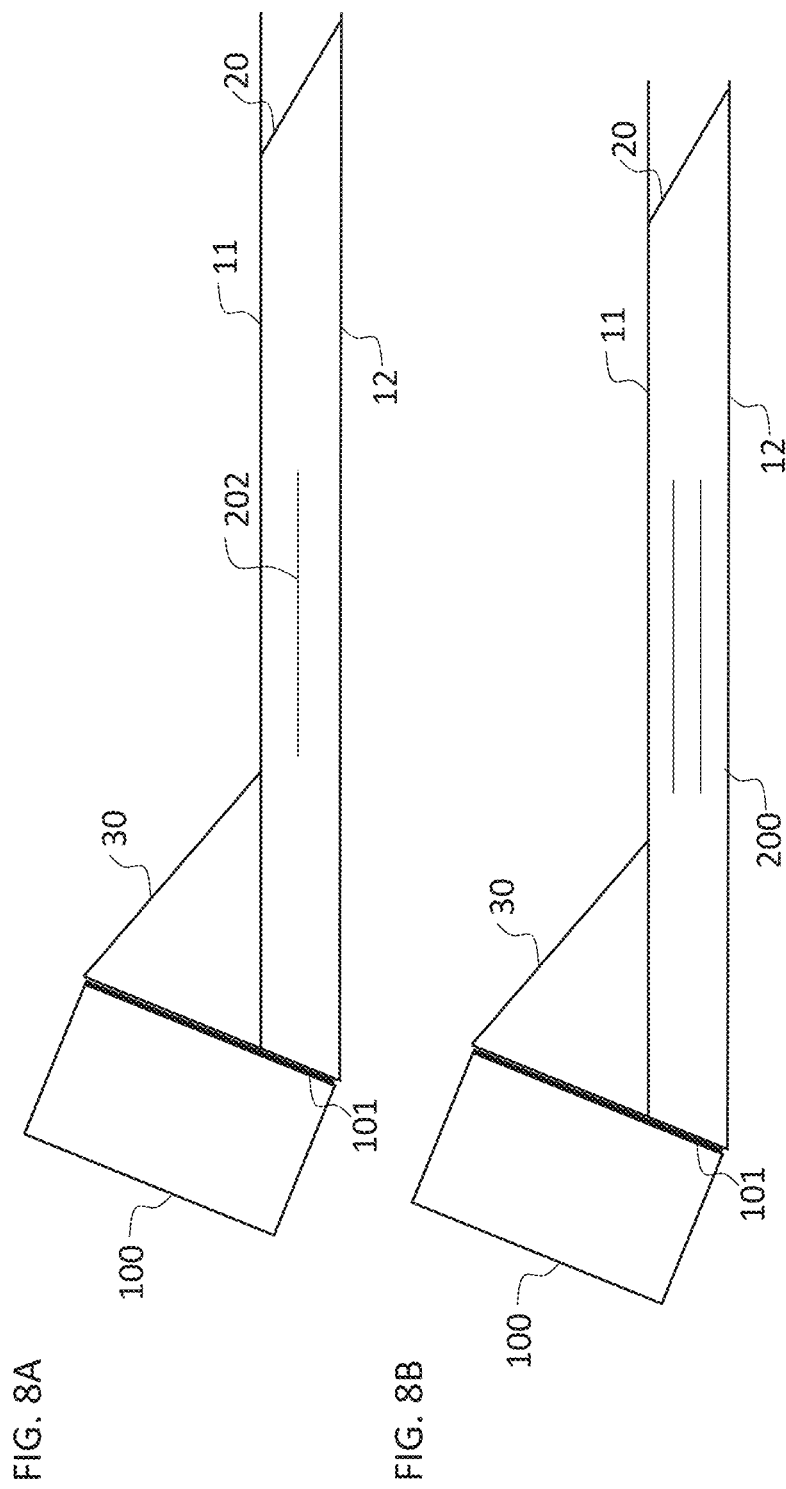

OPTICAL SYSTEM WITH COMPACT COUPLING FROM A PROJECTOR INTO A WAVEGUIDE

FIELD AND BACKGROUND OF THE INVENTION

The present invention relates to optical systems and, in particular, it concerns an optical system with compact coupling of an image from a projector into a waveguide.

Many virtual reality and augmented reality displays employ a light-guide optical element (LOE) with two major parallel planar surfaces within which an image propagates by internal reflection. Illumination corresponding to a collimated image is generated by a projector, and is introduced into the LOE at a coupling-in region. The illumination propagates within the LOE by internal reflection until reaching a coupling-out region where it is coupled out of the LOE towards the viewer's eye. Coupling out of the illumination toward the eye may be by use of a set of obliquely angled partially reflective internal surfaces, or by use of one or more diffractive optical element, all as well-known in the art. Coupling of the image illumination from the projector into the LOE may be achieved via a coupling prism.

SUMMARY OF THE INVENTION

The present invention is an optical system with compact coupling of an image from a projector into a waveguide.

According to the teachings of an embodiment of the present invention there is provided, an optical system comprising: (a) a light-guide optical element (LOE) formed from transparent material and having mutually-parallel first and second major external surfaces for guiding light by internal reflection; (b) a projector configured to project illumination corresponding to a collimated image from an aperture, the illumination exiting the aperture with a chief ray defining an optical axis of the projector and with an angular field about the chief ray; (c) a coupling prism attached to the first major external surface of the LOE, the coupling prism providing at least part of an image injection surface angled obliquely to the major external surfaces, the projector being associated with the image injection surface and oriented such that the chief ray and the angular field about the chief ray are injected through the image injection surface at angles of incidence relative to the major external surfaces greater than a critical angle for internal reflection at the major external surfaces; and (d) a reflective polarizing beam splitter deployed at an interface between the major external surface and the coupling prism parallel to the major external surfaces, at least part of the illumination being incident on the beam splitter with a first polarization and being transmitted by the beam splitter from the coupling prism into the LOE, light corresponding to a conjugate image of the collimated image and having a second polarization incident on the beam splitter from within the LOE being reflected from the beam splitter so as to propagate within the LOE by internal reflection.

According to a further feature of an embodiment of the present invention, there is also provided a waveplate deployed in a path of at least a part of the illumination to convert the illumination between the first polarization and the second polarization.

According to a further feature of an embodiment of the present invention, the waveplate is a quarter-wave plate associated with at least part of the second major external surface of the LOE.

According to a further feature of an embodiment of the present invention, the waveplate is a half-wave plate deployed in overlapping relation to a first part of the aperture without overlapping a second part of the aperture.

According to a further feature of an embodiment of the present invention, the first part of the aperture projects illumination through a part of the image injection surface from which light passes into the LOE without traversing the beam splitter.

According to a further feature of an embodiment of the present invention, the projector is configured to project illumination of the second polarization, wherein the first part of the aperture projects illumination through a part of the image injection surface from which light passes through the beam splitter, the half-wave plate converting illumination of the second polarization into illumination of the first polarization.

According to a further feature of an embodiment of the present invention, the image injection surface is provided in part by the coupling prism and in part by a surface of the LOE.

According to a further feature of an embodiment of the present invention, the image injection surface is provided entirely by the coupling prism.

BRIEF DESCRIPTION OF THE DRAWINGS

The invention is herein described, by way of example only, with reference to the accompanying drawings, wherein:

FIGS. 2A and 2B are schematic side views of a projector injecting an image into a waveguide via a coupling prism so as to fill the thickness of the waveguide with the image, illustrating a shallow extremity of the projected angular field and a steepest extremity of the projected angular field, respectively;

FIGS. 3A-3C are schematic side views of an optical system according to an embodiment of the present invention including a projector injecting an image into a waveguide via a coupling prism with a reflective polarizing beam splitter, illustrating a shallow extremity, a middle-field, and a steepest extremity of the projected angular field, respectively;

FIGS. 5A and 5B are schematic side views of an optical system according to a variant embodiment of the present invention, illustrating a shallow extremity, and a steepest extremity of the projected angular field, respectively;

FIGS. 6A and 6B are schematic side views of an optical system according to a further variant embodiment of the present invention, illustrating a shallow extremity, and a steepest extremity of the projected angular field, respectively;

FIGS. 7A-7C are schematic side views of an optical system according to any of the above embodiments, illustrating possible deployments of a retarder element to reduce polarization-related banding effects; and FIGS. 8A and 8B are schematic side views of an optical system according to any of the above embodiments, illustrating possible deployments of one or two internal partial-

DESCRIPTION OF THE PREFERRED EMBODIMENTS

The present invention is an optical system with compact coupling of an image from a projector into a waveguide.

The principles and operation of optical systems according to the present invention may be better understood with reference to the drawings and the accompanying description.

Figure 1:
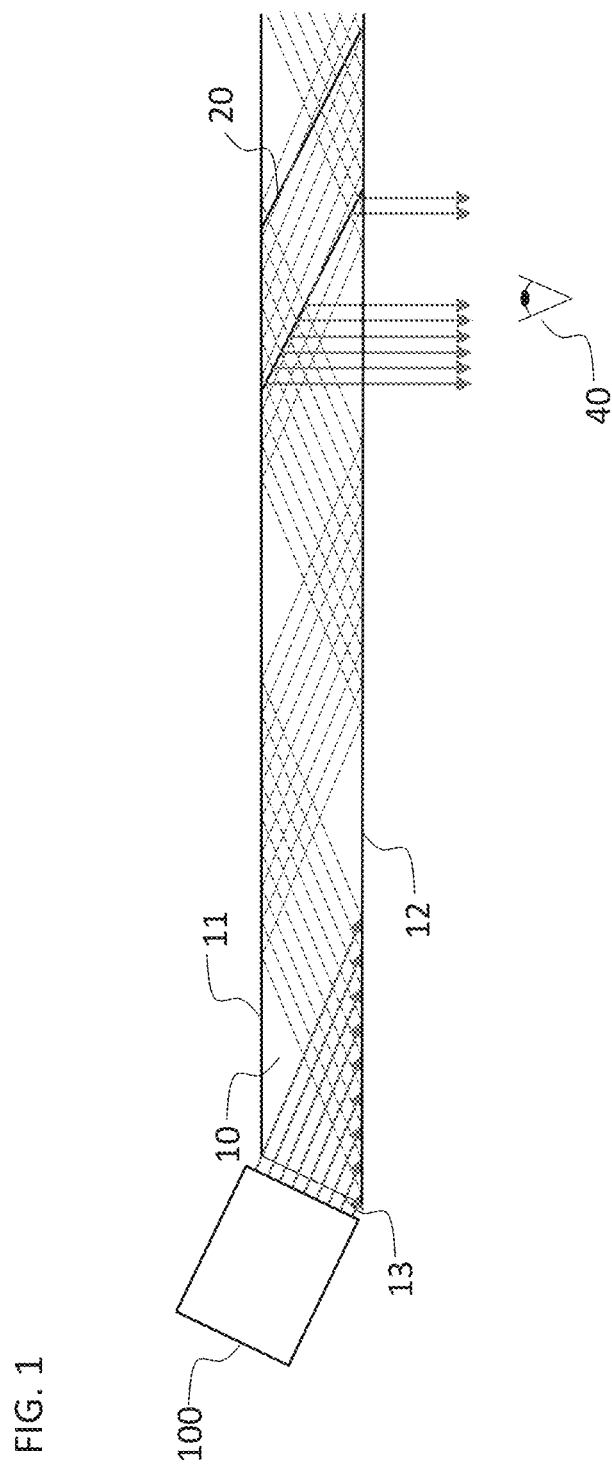
FIG. 1 is a schematic side view of a projector injecting an image into a waveguide via an edge surface, indicating incomplete filling of the waveguide with the image.

By way of introduction, FIG. 1 shows rays propagating inside a light-guide optical element (LOE) 10 (referred to herein interchangeably as a "waveguide") by internal reflection at mutually-parallel first and second major external surfaces 11 and 12. In this example, the rays are coupled out towards an eye 40 of an observer by embedded partially reflective mirrors 20, that are obliquely angled to the major external surfaces of the LOE. The invention is equally applicable to displays employing diffractive optical elements for coupling-out image illumination towards the eye of the observer, as is well-known in the art.

Illumination from a projector 100 corresponding to a collimated image is here shown injected into the waveguide at surface 13 in a simple manner that does not duplicate the injected image, and therefore a conjugated image is not generated. As a result, the rays propagating inside the waveguide contain 'holes', i.e., regions which the image illumination does not reach, and the rays reaching the observer's eye 40 are not uniform. The intensity distribution detected by the observer is therefore not uniform, and would change with different positions of the eye within an "eye motion box" (permissible viewing positions of the eye), and would depend on the specific field being observed.

In order to achieve uniform illumination of the outcoupled light, more advanced coupling-in configurations are often used, such as the one presented in FIGS. 2A and 2B. Here a projector 100 provides a larger aperture and is coupled to the LOE via a prism 30 so that rays injected into the waveguide and reflected by the lower surface of the waveguide 12 overlap rays that are injected directly from the projector. This assures that both the image and its conjugate are fully present inside the waveguide, referred to as "filling" the waveguide with the image illumination. Of course, this must be true for all fields supported by the waveguide. FIGS. 2A and 2B show the two extreme cases of a typical field of view, of about 20° wide inside the media, corresponding to about 30° wide in air. It will be noted that a significant proportion of the illumination for each field is lost (represented by ray directions which terminate at the back surface of the coupling prism rather than entering the LOE, due to falling outside the LOE aperture).

In principle, advanced projectors could be designed such that each field would be comprised only of rays that would eventually be coupled into the waveguide. However, these are difficult to design and suggest many technical complications (for instance, the apertures in such a system are at oblique angles to the chief ray, and are far from the projector, typically requiring a large projector). Furthermore, a projector of this type would have to be designed for a specific waveguide, and generic projectors of 'one fits all' are not possible.

Referring now generically to certain particularly preferred implementations of the present invention, there is provided an optical system including a light-guide optical element (LOE) 10 formed from transparent material and having mutually-parallel first and second major external surfaces 11, 12 for guiding light by internal reflection. A projector 100 is configured to project illumination corresponding to a collimated image from an aperture 101, the illumination exiting the aperture with a chief ray defining an optical axis 102 of the projector and with an angular field about the chief ray. FIG. 3B illustrates a set of rays parallel to the chief ray, while FIGS. 3A and 3C illustrate the shallowest-angle and steepest-angle rays of the angular field, respectively.

A coupling prism 30, attached to first major external surface 11 of the LOE, provides at least part of an image injection surface 32 angled obliquely to the major external surfaces 11 and 12. In the non-limiting example of FIGS. 3A-3C, image injection surface 32 is provided in part by coupling prism 30 and in part by an edge of LOE 10, polished together to form a continuous surface. Projector 100 is associated with image injection surface 32 and oriented such that the chief ray and the angular field about the chief ray are injected through the image injection surface at angles of incidence relative to the major external surfaces that are greater than a critical angle for internal reflection at the major external surfaces. In other words, the orientation of the projector and coupling prism are such that the image illumination can propagate within the LOE by internal reflection at the angles at which they were projected.

It is a particular feature of certain preferred implementations of the present invention that a reflective polarizing beam splitter 51 is deployed at an interface between the first major external surface 11 and the coupling prism 30, parallel to the major external surfaces. At least part of the illumination from projector 100 is incident on beam splitter 51 with a first polarization that is transmitted by the beam splitter from coupling prism 30 into LOE 10, while light corresponding to a conjugate image of the collimated image and having a second polarization is incident on the beam splitter from within the LOE and is reflected from the beam splitter so as to propagate within the LOE by internal reflection. The beam splitter thus differentiates between image illumination from projector 100, which is allowed to enter the LOE, and image illumination already within the LOE, which is prevented from escaping, and begins its propagation via internal reflection along the LOE.

Various arrangements can be used to effect the polarization conditioning which achieves the aforementioned functionality. In a particularly preferred subset of examples, a waveplate is deployed in a path of at least a part of the image illumination to convert the illumination between the first polarization and the second polarization. FIGS. 3A-3C illustrate one example of this, in which the waveplate is implemented as a quarter-wave plate 52 associated with at least part of the second major external surface 12 of the LOE.

Operation of this implementation is as follows. Light is projected from the projector 100 into the waveguide 10 p-polarized. (The option of employing p-polarized projected illumination is chosen arbitrarily for this example, but it should be understood that this example could equally be presented with projection of s-polarized illumination, and the p/s polarization designations interchanged throughout.) Reflective polarizing beam splitter 51 that (in this example) transmits p-polarized light and reflects s-polarized light is deployed between coupling prism 30 and upper surface 11. Optical retarder (quarter-wave plate) 52 is placed on at least part of lower surface 12 and acts to change the polarization of the incident rays.

Figure 4:
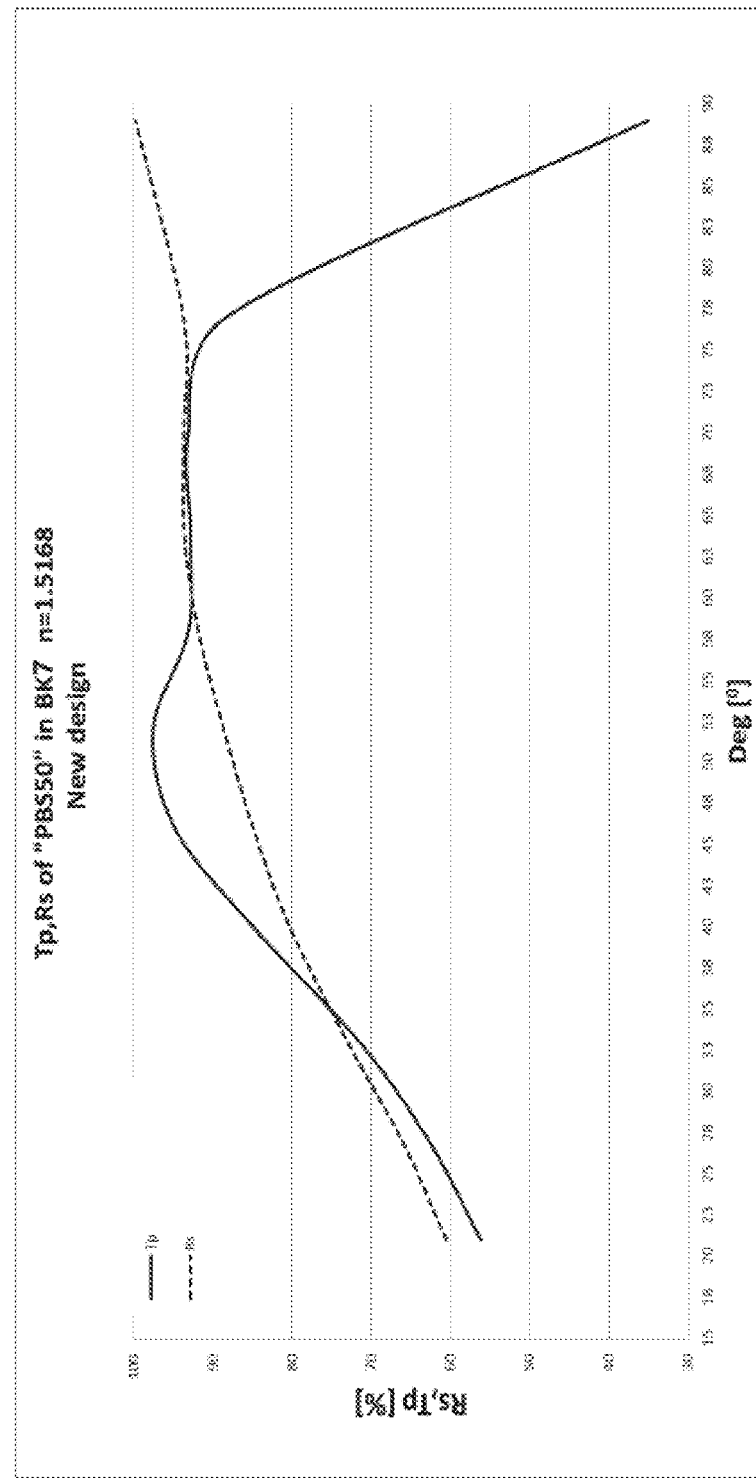
FIG. 4 is a graph illustrating transmissivity to p-polarization and reflectivity to s-polarization as a function of angle of incidence for a polarizing beam splitter suitable for use in an embodiment of the present invention.

FIG. 4 presents a plot of reflectivity and transmissivity of s and p polarizations (respectively) as a function of incident angle, describing a typical coating layer for surface 51, as is known in the field of polarizing beam splitters. Alternatively, a suitable effect may be achieved using a wire grid polarizer. Preferably, the retarder 52 would be a quarter waveplate, such that the polarization of light transmitted by the retarder back and forth would rotate, and would be converted from p-polarized to s-polarized light (or vice versa). As a result of this structure, rays projected by projector 100 are transmitted by beam splitter 51 and pass into the waveguide. Rays that impinge on 52 change their polarization, and are reflected by beam splitter 51 if they impinge on the beam splitter a second time, as illustrated in FIG. 3C. The selective properties of the beam splitter allow a much greater proportion of the injected image illumination to be coupled into the waveguide, with greatly reduced loss of energy. Additionally, the required size of the projector aperture is significantly smaller than in FIGS. 2A and 2B.

The retarder 52 could be implemented in many ways, including but not limited to crystalline zero-order crystalline retarders, thin film polycrystalline true-zero-order retarders, subwavelength structures and advanced dielectric layers coated directly onto the waveguide.

Optimally, the system is implemented so that rays of all fields are reflected from surface 51 only once before reaching the end of the coupling prism. Otherwise, some loss of light will typically occur.

In this embodiment, the steeper-propagating rays (FIG. 3C) may in some cases suffer from a non-uniform intensity profile. This may be mitigated in different ways, for instance, by using an embedded mixer element (namely, a partially reflected surface parallel to the major axes of the waveguide, described below with reference to FIGS. 8A and 8B), or by placing closely-spaced coupling-out facets in the waveguide. The non-uniformity may be reduced or even eliminated by careful design of the projector aperture and geometry of the coupling configuration.

Retarder 52 may be deployed only in the coupling-in region, or may extend over part or all of the waveguide. The retarder may also serve to rotate and mix the polarization along the waveguide, and mitigate any polarization artifacts that may arise, for instance, by the polarization-dependent coupling-in configuration of this embodiment. The retarder could be located on the external surface of the waveguide, or between the waveguide 10 and external thin cover-plates (not shown), which may be used to enhance uniformity of out-coupled illumination.

In this and other embodiments described herein, trapping of light within the LOE by beam splitter 51 relatively close to the image injection surface provides advantages for design of image projector 100. Specifically, for optical efficiency, the entrance aperture of the waveguide is preferably imaged by the projector optics (illumination optics plus collimating optics, not shown) to the illuminations stop of the projector. In the design for FIGS. 2A and 2B, the effective aperture to the waveguide is at the end of the coupling prism, far from the image injection surface. In contrast, the design of FIGS. 3A-3C and the subsequent examples herein provide an effective waveguide aperture that is much closer to the image injection surface 32, allowing the use of a generic projector design in which the illumination stop is imaged to the projector exit aperture and typically facilitating the use of a smaller overall size of the projector.

FIGS. 5A and 5B show an alternative implementation of an embodiment of the invention where the image injection surface 32 is provided entirely by coupling prism 30, resulting in projector 100 being placed on top of the waveguide. Such a configuration would be significantly easier to manufacture, but results in a slightly larger aperture. In all other respects, the structure and operation of the implementation of FIGS. 5A and 5B are analogous to those of FIGS. 3A-3C.

FIGS. 6A and 6B illustrate an alternative implementation which, instead of employing a retarder on the second major surface of the waveguide, employs a retarder 52 in the form of a half-wave plate deployed in overlapping relation to a first part of the aperture 101 without overlapping a second part of the aperture. In the case illustrated here, the "first" part of the aperture projects illumination through a part of the image injection surface 32 from which light passes through beam splitter 51. This is suited to a case in which the projector projects a polarization which is reflected by the beam splitter. The polarization which is reflected by the beam splitter is introduced directly into the LOE in the lower part of the coupling-in surface, as shown, and is therefore trapped by the beam splitter and propagates by internal reflection along the LOE, while the half-wave plate 52 converts the illumination of the second polarization into illumination of the first polarization in the upper part of the aperture as shown, allowing that part of the image illumination to be transmitted by the beam splitter and to enter the LOE.

Thus, by way of a specific example, in the case of FIGS. 6A and 6B where the beam splitter passes p-polarization and reflects s-polarization, the rays of the lower part of the image injection surface that are injected directly into the waveguide and that do not propagate through the retarder 51 are s-polarized, while the rays of the upper part of the image injection surface, that do propagate through the retarder 51, (which here preferably acts as a half waveplate) are injected into the waveguide at p-polarization.

Clearly, an equivalent effect can be achieved by using a projector which generates the polarization that is transmitted by the beam splitter, and deploying the half-wave plate 52 on the part of the image injection surface 32 through which light is coupled directly into the LOE without traversing the beam splitter (the lower part, in the orientation illustrated here).

In all of the embodiments described herein, the beam splitter is described as being at an interface between the first major external surface 11 and the coupling prism 30, and parallel to the major external surfaces. The "interface" for this purpose is defined functionally as the region in which light passes from coupling prism 30 into LOE 10. Most preferably, the beam splitter is deployed coplanar with the first major external surface 11, typically either as a coating applied to one or other of the facing surfaces of coupling prism 30 into LOE 10 prior to bonding, or as a film or other layer sandwiched between the coupling prism 30 and LOE 10. However, deployment of the beam splitter embedded within coupling prism 30 or within LOE 10 would also be considered to be "at the interface" so long as it is sufficiently close to the interface to provide the functionality described above. In all of the illustrated cases, parallelism of the beam splitter to the major surfaces of the LOE is essential in order to avoid generating ghost images as the image illumination propagates along the LOE.

The various coupling-in arrangements described above inherently couple light into the waveguide in a mixed polarization state, i.e., with a superposition of p and s polarized light, such that for a certain field some regions of the input aperture are composed of p-polarized light and other regions of the input aperture are composed of s-polarized light. Since the embedded (refractive or diffractive) components that couple light out of the waveguide are typically polarization sensitive, this could potentially result in striped (non-uniform intensity) images at the output.

In principle, the embedded elements could be designed and optimized to maximize uniformity by matching the conditions of both polarization states, but this is usually very difficult to achieve; and would come at the price of efficiency, color uniformity etc. Therefore, a number of alternative approaches are proposed below to ameliorate effects of the mixed-polarization illumination coupled into the waveguide.

As presented in FIGS. 7A-7C, a polarization retarder 201 can be placed inside the waveguide so that it controls the polarization state of the light inside the waveguide. The retarder can be made from a birefringent crystal, from a thin layer of polymer or from a structural or spatially varying coating or spatially varying grating. Such an element can be embedded inside the waveguide (as described in coassigned PCT patent application no. PCT/IL2021/051143), or it can be bonded separately between the waveguide and the coupling-in wedge, if these are produced separately. The thickness of the retarder can be set to a preferred thickness. For instance, it can be thin, such that it would operate as a true quarter waveplate for the relevant wavelengths and considering the angle of incidence of all fields in the field of view (FOV), such that s and p polarized light transmitted by the retarder would be converted to (approximately) circularly polarized (but with opposite handedness).

In an alternative but conceptually-related implementation, the projector 100 may be configured to generate circularly polarized image illumination, and the polarized beam splitter 51 can correspondingly be implemented as a circular-polarized beam splitter. In this manner, light coupled into the waveguide would be either right or left-handed circularly polarized, and the uniformity of the output light would be significantly improved.

Alternatively, the retarder can be made "thick", defined by $$d > \frac{\Delta \lambda}{\Delta n},$$

where d is the thickness of the retarder, $\Delta\lambda$ is the spectral bandwidth of each transmitted color and $\Delta n = |n_e - n_o|$ where $n_e$ and $n_o$ are the extraordinary and ordinary refractive indices of the retarder. Typically, d~0.1-1 mm is sufficient for the retarder to provide a "depolarizing" effect. Specifically, different wavelengths within a given color spectral bandwidth are rotated to different polarization states, and the superposition of all wavelengths behaves effectively as unpolarized light.

A thick retarder may cause unwanted artifacts in the configurations of FIGS. 7B and 7C, due to the different optical paths through the retarder that would generate ghost images. This can be resolved if the retarder is placed perpendicular to the waveguide with sufficient accuracy, as in FIG. 7A. In this case, the angular orientation of all rays propagating through the retarder is maintained, and no ghost images are expected.

If the projector outputs image illumination in a polarization state that is not orthogonal to the waveguide, i.e., not pure s or p polarized light according to the waveguide axes, but rather a linear superposition of the two, the polarization of each wavelength would rotate at each reflection of TIR on the major surfaces of the waveguide. This would effectively have a similar effect to the thick retarder in FIG. 7. This mixing of the coating could be further enhanced by coating the major surfaces of the waveguide with a dedicated coating, as in patent WO2021105978A1.

Another approach could be to place a partially reflective layer 202 in the middle of the waveguide and parallel to the major external surfaces (as disclosed in PCT patent application publication no. WO 2021/079372), that would mix the light. Examples of such a structure are illustrated in FIGS. 8A and 8B. According to this option, the light of each field would be uniform throughout the waveguide, however the proportion of p and s polarized light might still vary from one field to another. This effect would need to be accounted for when designing the properties of the diffractive or refractive elements that are embedded inside the waveguide.

The various implementations of the present invention described here are applicable in a wide range of contexts, and employing any type of waveguide and any type of projector. For example, projectors 100 may employ any suitable image-generating technology including, but not limited to, liquid crystal transmissive or reflective (LCOS) projectors, scanned-laser projectors or DLP projectors, all employing any suitable collimating optics.

It will be appreciated that the above descriptions are intended only to serve as examples, and that many other embodiments are possible within the scope of the present invention as defined in the appended claims.

What is claimed is:

1. An optical system comprising:
 (a) a light-guide optical element (LOE) formed from transparent material and having mutually-parallel first and second major external surfaces for guiding light by internal reflection;
 (b) a projector configured to project illumination corresponding to a collimated image from an aperture, the illumination exiting said aperture with a chief ray defining an optical axis of said projector and with an angular field about the chief ray;
 (c) a coupling prism attached to said first major external surface of said LOE, said coupling prism providing at least part of an image injection surface angled obliquely to said major external surfaces, said projector being associated with said image injection surface and oriented such that the chief ray and the angular field about the chief ray are injected through said image injection surface at angles of incidence relative to said major external surfaces greater than a critical angle for internal reflection at said major external surfaces; and
 (d) a reflective polarizing beam splitter deployed at an interface between said major external surface and said coupling prism parallel to said major external surfaces, at least part of the illumination being incident on said beam splitter with a first polarization and being transmitted by said beam splitter from said coupling prism into said LOE, light corresponding to a conjugate image of the collimated image and having a second polarization incident on said beam splitter from within said LOE being reflected from said beam splitter so as to propagate within said LOE by internal reflection.

2. The optical system of claim 1, further comprising a waveplate deployed in a path of at least a part of the illumination to convert the illumination between said first polarization and said second polarization.

3. The optical system of claim 2, wherein said waveplate is a quarter-wave plate associated with at least part of said second major external surface of said LOE.

4. The optical system of claim 2, wherein said waveplate is a half-wave plate deployed in overlapping relation to a first part of said aperture without overlapping a second part of said aperture.

5. The optical system of claim 4, wherein said first part of said aperture projects illumination through a part of said image injection surface from which light passes into said LOE without traversing said beam splitter.

6. The optical system of claim 4, wherein said projector is configured to project illumination of said second polarization, wherein said first part of said aperture projects illumination through a part of said image injection surface from which light passes through said beam splitter, said half-wave plate converting illumination of said second polarization into illumination of said first polarization.

7. The optical system of claim 1, wherein said image injection surface is provided in part by said coupling prism and in part by a surface of said LOE.

8. The optical system of claim 1, wherein said image injection surface is provided entirely by said coupling prism.

* * * * *